(12) United States Patent
Kerrigan et al.

(10) Patent No.: US 10,106,425 B2
(45) Date of Patent: Oct. 23, 2018

(54) SYNTHESIS METHODS FOR HALOSILANES

(71) Applicants: Air Liquide Advanced Materials, Inc., Branchburg, NJ (US); L'Air Liquide, Société Anonyme pour l'Etude et l'Exploitation des Procédés Georges Claude, Paris (FR)

(72) Inventors: Sean Kerrigan, Princeton, NJ (US); Zhiwen Wan, Plano, TX (US); Jean-Marc Girard, Versailles (FR)

(73) Assignees: L'Air Liquide, Société Anonyme pour l'Etude et l'Exploitation des Procédés Georges Claude, Paris (FR); Air Liquide Advanced Materials, Inc., Branchburg, NJ (US)

( * ) Notice: Subject to any disclaimer, the term of this patent is extended or adjusted under 35 U.S.C. 154(b) by 112 days.

(21) Appl. No.: 15/159,454

(22) Filed: May 19, 2016

(65) Prior Publication Data

US 2016/0264426 A1   Sep. 15, 2016

(51) Int. Cl.
   *C01B 33/107*   (2006.01)
(52) U.S. Cl.
   CPC .................. *C01B 33/107* (2013.01)
(58) Field of Classification Search
   CPC .................................................. C01B 33/107
   See application file for complete search history.

(56) References Cited

U.S. PATENT DOCUMENTS 4,985,579 A * 1/1991 Bokerman ........ C01B 33/10778
                                                        556/466
2013/0259791 A1* 10/2013 Brausch .................. C01B 33/04
                                                        423/342

FOREIGN PATENT DOCUMENTS

WO    WO 2006 044019      8/2005
WO    WO 2009 087609      7/2009

OTHER PUBLICATIONS

Emeleus, H.J. et al., "Derivatives of monosilane. Part II. The iodo-compounds," J. Chem. Soc. 1941, 353-358.
Gupper, A. et al., "Synthesis and properties of 1,2-Dichlorodisilane and 1,1,2-Trichlorodisilane," Eur. J. Inorg. Chem. 2001, 2007-2011.
Hassler, K. et al., "Synthese und Kemresonanzspektren von Bromdisilanen und Ioddisilanen," Journal of Organometallic Chemistry, 398 (1990) 225-227.
Tamizhmani, G. et "Some physical properties of undoped amorphous silicon prepared by a new chemical vapor deposition process using iodosilanes," Chem. Mater. 1990 2 473-476.
International Search Report and Written Opinion for corresponding PCT/US2017/033576, dated Aug. 30, 2017.

(Continued)

*Primary Examiner* — Ngoc-Yen Nguyen
(74) *Attorney, Agent, or Firm* — Patricia E. McQueeney

(57) ABSTRACT

Disclosed are methods of selectively synthesizing inorganic silanes, such as halosilane and dihalosilane, comprising the step of reacting the halide or halogen (i.e., HX or $X_2$ wherein X is Cl, Br, or I) with $RSiH_3$, wherein R is an unsaturated C4 to C8 cyclic hydrocarbon or heterocycle group, provided that a C6 cyclic aromatic includes at least one hydrocarbyl ligand, in the presence of a catalyst, to produce RH and the inorganic silane having the formula $Si_xH_aX_b$, wherein x=1-4; a=1-9; b=1-9; and a+b=2x+2.

13 Claims, 2 Drawing Sheets

(56) References Cited

OTHER PUBLICATIONS

Fritz, G. et al., Die Spaltung des $C_6H_5SiH_3$ mit Jod und HJ (Eine einfache Darstellung von $SiH_3J$), D. Z. Anorg. Allg. Chem. 1960, 304, 322.

Keinan, E. et al., Diiodosilane. 1. A Novel Reagent for Deoxygenation of Alcohols and Ethers, J. Org. Chem., 1987, pp. 4846-4851, vol. 52, No. 22.

\* cited by examiner

SYNTHESIS METHODS FOR HALOSILANES

TECHNICAL FIELD

Disclosed are methods of selectively synthesizing inorganic silanes, such as halosilane and dihalosilane, comprising the step of reacting a halide or halogen (i.e., HX or $X_2$ wherein X is Cl, Br, or I) with $RSiH_3$, wherein R is an unsaturated C4 to C8 cyclic hydrocarbon or heterocycle group, provided that a C6 cyclic aromatic includes at least one hydrocarbyl ligand, in the presence of a catalyst, to produce RH and the inorganic silane having the formula $Si_xH_aX_b$, wherein x=1-4; a=1-9; b=1-9; and a+b=2x+2.

BACKGROUND

Eméleus et al., disclose synthesis of diiodosilane ($SiH_2I_2$) by reaction of Silane ($SiH_4$), Hydrogen Iodide (HI), and aluminum iodide ($AlI_3$). Derivatives of monosilane. Part II. The Iodo compounds: Emeleus, H. J.; Maddock, A, G.; Reid, C., *J. Chem. Soc.* 1941, 353-358). The reaction produces the desired $SiH_2I_2$ reaction product along with Iodosilane ($SiH_3I$), Triiodosilane ($SiHI_3$), and tetraiodosilane ($SiI_4$). Id. at p. 354.

Keinan et al. disclose the reaction of iodine and phenylsilane in a 1:1 molar ratio in the presence of traces of ethyl acetate at −20° C. produces 1 mol of $SiH_2I_2$ and 1 mol of benzene. J. Org. Chem., Vol. 52, No. 22, 1987, pp. 4846-4851. Although selective for $SiH_2I_2$ over the other possible iodosilanes (i.e., $SiH_3I$, $SiHI_3$, and $SiI_4$), this method produces the known human carcinogen benzene, which makes commercial implementation difficult. Despite this drawback, it remains the preferred synthetic approach to producing Diiodosilane.

A need remains for a less hazardous $SiH_2I_2$ synthesis method that yields large volumes of the $SiH_2I_2$ product (i.e., and few to no volumes of the other iodosilanes: $SiH_3I$, $SiHI_3$, and $SiI_4$).

SUMMARY

Methods of synthesizing inorganic silanes and polysilanes are disclosed. The inorganic silanes and polysilanes have the formula:

$$Si_xH_aX_b,$$

wherein X is Cl, Br, or I; x=1-4; a=1-9; b=1-9; and a+b=2x+2. The methods comprise mixing a halide having the formula HX or a halogen having the formula $X_2$ with a silane reactant having the formula:

$$Si_xH_yR_z$$

wherein y=1-9; z=1-9; y+z=2x+2; and R is an unsaturated C4 to C8 cyclic hydrocarbon or heterocycle group, provided that a C6 cyclic aromatic includes at least one hydrocarbyl ligand to produce the inorganic silane and RH reaction product mixture.

The silane synthesis methods comprise mixing a halogen having the formula:

$$X_2$$

wherein X is Cl, Br, or I, with a silane reactant having the formula:

$$SiH_3R$$

wherein R is an unsaturated C4 to C8 cyclic hydrocarbon or heterocycle group, provided that a C6 cyclic aromatic includes at least one hydrocarbyl ligand, in the presence of a catalyst, to produce a dihalosilane (i.e., $SiH_2X_2$) and RH reaction product mixture.

Alternatively, the silane synthesis methods comprise mixing a halide having the formula:

$$HX$$

wherein X is Cl, Br, or I, with a silane reactant having the formula:

$$SiH_3R$$

wherein R is an unsaturated C4 to C8 cyclic hydrocarbon or heterocycle group, provided that a C6 cyclic aromatic includes at least one alkyl ligand to produce a halosilane (i.e., $SiH_3X$) and RH reaction product mixture.

Any of the disclosed methods may include one or more of the following aspects:
- the inorganic silane being $SiH_2X_2$;
- the inorganic silane being $SiH_2I_2$;
- the inorganic silane being $SiH_2Br_2$;
- the inorganic silane being $SiH_2Cl_2$;
- the inorganic silane being $SiH_3X$;
- the inorganic silane being $SiH_3I$;
- the inorganic silane being $SiH_3Br$;
- the inorganic silane being $SiH_3Cl$;
- the inorganic silane being $Si_2H_5X$;
- the inorganic silane being $Si_2H_5I$;
- the inorganic silane being $Si_2H_5Br$;
- the inorganic silane being $Si_2H_5Cl$;
- the inorganic silane being $Si_2H_4X_2$;
- the inorganic silane being $Si_3H_7X$;
- the inorganic silane being $Si_3H_6X_2$;
- the inorganic silane being $Si_4H_9X$;
- the inorganic silane being $Si_4H_8X_2$;
- X=I;
- X=Br;
- X=Cl;
- the HX halide having a purity ranging from approximately 95% wt/wt to approximately 100% wt/wt;
- the HX halide having a purity ranging from approximately 99% wt/wt to approximately 100% wt/wt;
- the HX halide comprising between 0.0% wt/wt and 0.001% w/w $H_2O$;
- the $X_2$ halogen having a purity ranging from approximately 95% wt/wt to approximately 100% wt/wt;
- the $X_2$ halogen having a purity ranging from approximately 99% wt/wt to approximately 100% wt/wt;
- the $X_2$ halogen comprising between 0.0% wt/wt and 0.001% w/w $H_2O$;
- R being an aromatic hydrocarbon;
- the aromatic hydrocarbon being toluene, ethylbenzene, xylene, mesitylene, or durene;
- R not being benzene;
- the aromatic hydrocarbon being naphthalene or azulene;
- the aromatic hydrocarbon being cyclopendatienyl, tropylium, or cyclooctatetraene;
- R being non-substituted;
- R being substituted by one or more saturated C1 to C10 hydrocarbon ligands;
- R being substituted by one or more saturated C1 to C10 alkyl ligands;
- R being an unsaturated cyclic C4 hydrocarbon group;
- R being an unsaturated cyclic C4 heterocycle group;
- R being an unsaturated cyclic C5 hydrocarbon group;
- R being an unsaturated cyclic C5 heterocycle group;
- R being furan;
- R being an unsaturated cyclic C6 hydrocarbon group;

R being an unsaturated cyclic C6 heterocycle group;
R being pyridine;
R being a substituted C6 aryl group, having one or more saturated C1-C10 hydrocarbyl ligands;
R being a substituted C6 aryl group, having one or more saturated C1-C10 alkyl ligands;
R being a substituted C6 aryl group, having one or more saturated C1-C4 alkyl ligands;
R being a substituted C6 aryl group, having one or more saturated C1-C2 alkyl ligands;
R being an unsaturated cyclic C7 hydrocarbon group;
R being an unsaturated cyclic C7 heterocycle group;
R being an unsaturated cyclic C8 hydrocarbon group;
R being an unsaturated cyclic C8 heterocycle group;
the silane reactant being

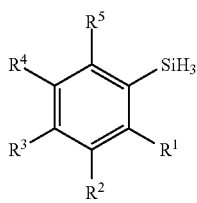

with $R^1$, $R^2$, $R^3$, $R^4$, and $R^5$ being independently selected from H or a $C_1$ to $C_{10}$ hydrocarbyl group, provided that at least one of $R^1$, $R^2$, $R^3$, $R^4$, and $R^5$ is not H;
the silane reactant having a purity ranging from approximately 95% wt/wt to approximately 100% wt/wt;
the silane reactant having a purity ranging from approximately 99% wt/wt to approximately 100% wt/wt;
the silane reactant comprising between 0.0% wt/wt and 0.001% w/w $H_2O$;
the silane reactant being

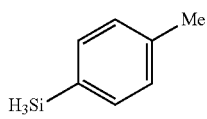

the silane reactant being

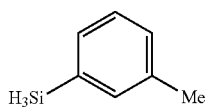

the silane reactant being

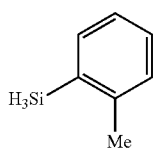

the silane reactant being

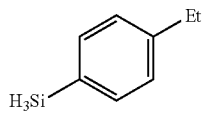

the silane reactant being

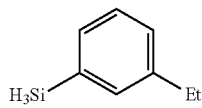

the silane reactant being

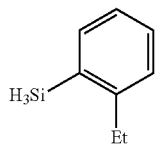

the silane reactant being

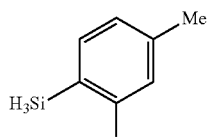

the silane reactant being

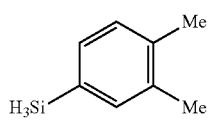

the catalyst being ethyl acetate, Palladium (II) acetate, triphenyl phosphine oxide, acetone, or combinations thereof;
the catalyst having a purity ranging from approximately 95% w/w to approximately 100% w/w;
the catalyst having a purity ranging from approximately 99% w/w to approximately 100% w/w;
adding the catalyst to the reactor prior to addition of the reactants;
adding a palladium acetate catalyst to the reactor prior to addition of the reactants;
mixing the silane reactant and catalyst under an inert atmosphere;
mixing the silane reactant and ethyl acetate under an inert atmosphere;
the inert atmosphere being Ar, $N_2$, He, or Kr;
the inert atmosphere being Ar;
the inert atmosphere being $N_2$;
further comprising adding a solvent;
further comprising adding a solvent to the halide or halogen;
further comprising adding the halide or halogen to a solvent;

further comprising adding the halide or halogen to a solvent under an inert atmosphere;

further comprising adding the halide or halogen to a solvent under an air atmosphere;

the solvent having a purity ranging from approximately 95% w/w to approximately 100% w/w;

the solvent having a purity ranging from approximately 99% w/w to approximately 100% w/w;

the solvent comprising between 0.0% wt/wt and 0.001% w/w $H_2O$;

the solvent being a hydrofluoroether or hydrocarbon solvent;

the hydrocarbon solvent being toluene, cyclohexane, n-heptane, or mixtures thereof;

the hydrofluoroether solvent being a mixture of methyl nonafluorobutyl ether and ethyl nonafluorbutyl ether;

the hydrofluoroether solvent comprising between about 10% and 90%, preferably about 30%, by volume, of methyl nonafluorobutyl ether;

the hydrofluoroether solvent comprising between about 10% and 90%, preferably about 70%, by volume, of ethyl nonafluorobutyl either;

performing the synthesis without a solvent;

performing the method neat;

the synthesis process being benzene-free;

the synthesis process converting approximately 80% mol/mol to approximately 90% mol/mol of the silane reactant to the inorganic silane;

maintaining the reaction at a temperature ranging from approximately −20° C. to approximately 15° C.;

maintaining the reaction at a temperature ranging from approximately −8° C. to approximately 5° C.;

maintaining the inorganic silane and RH reaction product mixture at a temperature ranging from approximately −20° C. to approximately 15° C. during the addition of the catalyst/silane mixture to the halide or halogen;

maintaining the inorganic silane and RH reaction product mixture at a temperature ranging from approximately −8° C. to approximately 5° C. during the addition of the catalyst/silane mixture to the halide or halogen;

adding the catalyst/silane mixture to the halide or halogen at a rate that maintains the reaction at a temperature ranging from approximately −20° C. to approximately 15° C.;

adding the catalyst/silane mixture to the halide or halogen at a rate that maintains the reaction at a temperature ranging from approximately −8° C. to approximately 5° C.;

further comprising stirring the inorganic silane and RH reaction product mixture for approximately 6 to approximately 15 hours;

further comprising mixing the inorganic silane and RH reaction product mixture for approximately 6 to approximately 15 hours after the addition of the catalyst/silane mixture;

further comprising cooling the inorganic silane and RH reaction product mixture to separate the dihalosilane and RH reaction products;

further comprising cooling the inorganic silane and RH reaction product mixture to a temperature ranging from approximately −78° C. to approximately −20° C. to separate the dihalosilane and RH reaction products;

further comprising separating the inorganic silane reaction product from the RH reaction product by distillation;

further comprising separating the inorganic silane reaction product from the RH reaction product by vacuum fractional distillation;

further comprising separating the inorganic silane reaction product from the RH reaction product by crystallization;

further comprising separating the inorganic silane reaction product from the RH reaction product by fractional crystallization;

further comprising distilling the inorganic silane (i.e., $Si_xH_aX_b$) and RH reaction product mixture to isolate the inorganic silane;

further comprising subliming the inorganic silane (i.e., $Si_xH_aX_b$) and RH reaction product mixture to isolate the inorganic silane;

the inorganic silane comprising 0% benzene;

the inorganic silane comprising between approximately 0.0% w/w and 0.2% w/w RH;

the inorganic silane comprising between approximately 0.0% w/w and 0.2% w/w RX;

the inorganic silane comprising between approximately 0.0% w/w and 0.1% w/w $SiH_3X$;

the inorganic silane comprising between approximately 0.0% w/w and 0.2% w/w $SiH_3X$; and the inorganic silane comprising between approximately 0.0% w/w and 0.2% w/w $SiX_3H$; and the inorganic silane comprising between approximately 0.0% w/w and 0.01% w/w HX.

Also disclosed are Si-containing film forming compositions comprising between approximately 99.0% and 99.9% of an inorganic silane having the formula $Si_xH_aX_b$, wherein x=1-4; a=1-9; b=1-9; and a+b=2x+2, and between approximately 0.0% w/w and 0.01% (100 ppmw) w/w benzene. The disclosed Si-containing film forming composition may include one or more of the following embodiments:

the inorganic silane being $SiH_2I_2$;

the inorganic silane being $SiH_3I$;

the inorganic silane being $SiH_2Br_2$;

the inorganic silane being $SiH_3Br$;

the inorganic silane being $SiH_2Cl_2$;

the inorganic silane being $SiH_3Cl$;

the inorganic silane being $Si_2H_4I_2$;

the inorganic silane being $Si_2H_5I$;

the inorganic silane being $Si_2H_4Br_2$;

the inorganic silane being $Si_2H_5Br$;

the inorganic silane being $Si_2H_4Cl_2$;

the inorganic silane being $Si_2H_5Cl$;

the inorganic silane being $Si_3H_6I_2$;

the inorganic silane being $Si_3H_7I$;

the inorganic silane being $Si_3H_6Br_2$;

the inorganic silane being $Si_3H_7Br$;

the inorganic silane being $Si_3H_6Cl_2$;

the inorganic silane being $Si_3H_7Cl$;

the inorganic silane being $Si_4H_8I_2$;

the inorganic silane being $Si_4H_9I$;

the inorganic silane being $Si_4H_8Br_2$;

the inorganic silane being $Si_4H_9Br$;

the inorganic silane being $Si_4H_8Cl_2$;

the inorganic silane being $Si_4H_9Cl$;

between approximately 0.0% w/w and 0.2% w/w chlorotoluene;

between approximately 0.0% w/w and 0.001% w/w chlorotoluene;

between approximately 0.0% w/w and 0.2% w/w toluene; and between approximately 0.0% w/w and 0.1% w/w HX.

Notation and Nomenclature

Certain abbreviations, symbols, and terms are used throughout the following description and claims, and include:

As used herein, the indefinite article "a" or "an" means one or more.

As used herein, the terms "approximately" or "about" mean ±10% of the value stated.

Any and all ranges recited herein are inclusive of their endpoints (i.e., x=1 to 4 includes x=1, x=4, and x=any number in between).

As used herein, the term "alkyl group" refers to saturated functional groups containing exclusively carbon and hydrogen atoms. Further, the term "alkyl group" refers to linear, branched, or cyclic alkyl groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the term "hydrocarbon" or "hydrocarbyl" means either a solvent or a functional group, depending on the context, containing exclusively hydrogen and carbon atoms. The solvent or functional group may be saturated (containing only single bonds) or unsaturated (containing double or triple bonds).

As used herein, the term "heterocycle" means cyclic compounds that have atoms of at least two different elements as members of its ring.

As used herein, the term "aromatic" means a hydrocarbon with sigma bonds and delocalized pi electrons between carbon atoms.

As used herein, the term "aryl" means an aromatic ring compounds where one hydrogen atom has been removed from the ring.

As used herein, the abbreviation "Me" refers to a methyl group; the abbreviation "Et" refers to an ethyl group; the abbreviation "Pr" refers to any propyl group (i.e., n-propyl or isopropyl); the abbreviation "iPr" refers to an isopropyl group; the abbreviation "Bu" refers to any butyl group (n-butyl, iso-butyl, t-butyl, sec-butyl); the abbreviation "tBu" refers to a tert-butyl group; the abbreviation "sBu" refers to a sec-butyl group; the abbreviation "iBu" refers to an iso-butyl group; the abbreviation "Ph" refers to a phenyl group; and the abbreviation "Cp" refers to cyclopentadienyl group.

The standard abbreviations of the elements from the periodic table of elements are used herein. It should be understood that elements may be referred to by these abbreviations (e.g., Co refers to cobalt, Si refers to silicon, C refers to carbon, etc.)

Please note that the films or layers deposited, such as cobalt oxide, are listed throughout the specification and claims without reference to their proper stoichoimetry (i.e., $CoSi_2$). The layers may include pure (M) layers, silicide ($M_oSi_p$) layers, carbide ($M_oC_p$) layers, nitride ($M_kN_l$) layers, oxide ($M_nO_m$) layers, or mixtures thereof, wherein M is Co, Mn, Fe, or Ru; and k, l, m, n, o, and p inclusively range from 1 to 6. For instance, cobalt silicide is $Co_kSi_l$, where k and l each range from 0.5 to 5. Similarly, $Co_nO_m$ may include CoO and $Co_3O_4$. Any referenced layers may also include a Silicon oxide layer, $Si_nO_m$, wherein n ranges from 0.5 to 1.5 and m ranges from 1.5 to 3.5. More preferably, the silicon oxide layer is $SiO_2$ or $SiO_3$. The silicon oxide layer may be a silicon oxide based dielectric material, such as organic based or silicon oxide based low-k dielectric materials such as the Black Diamond II or III material by Applied Materials, Inc. Alternatively, any referenced silicon-containing layer may be pure silicon. Any silicon-containing layers may also include dopants, such as B, C, P, As and/or Ge.

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x$ $(NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
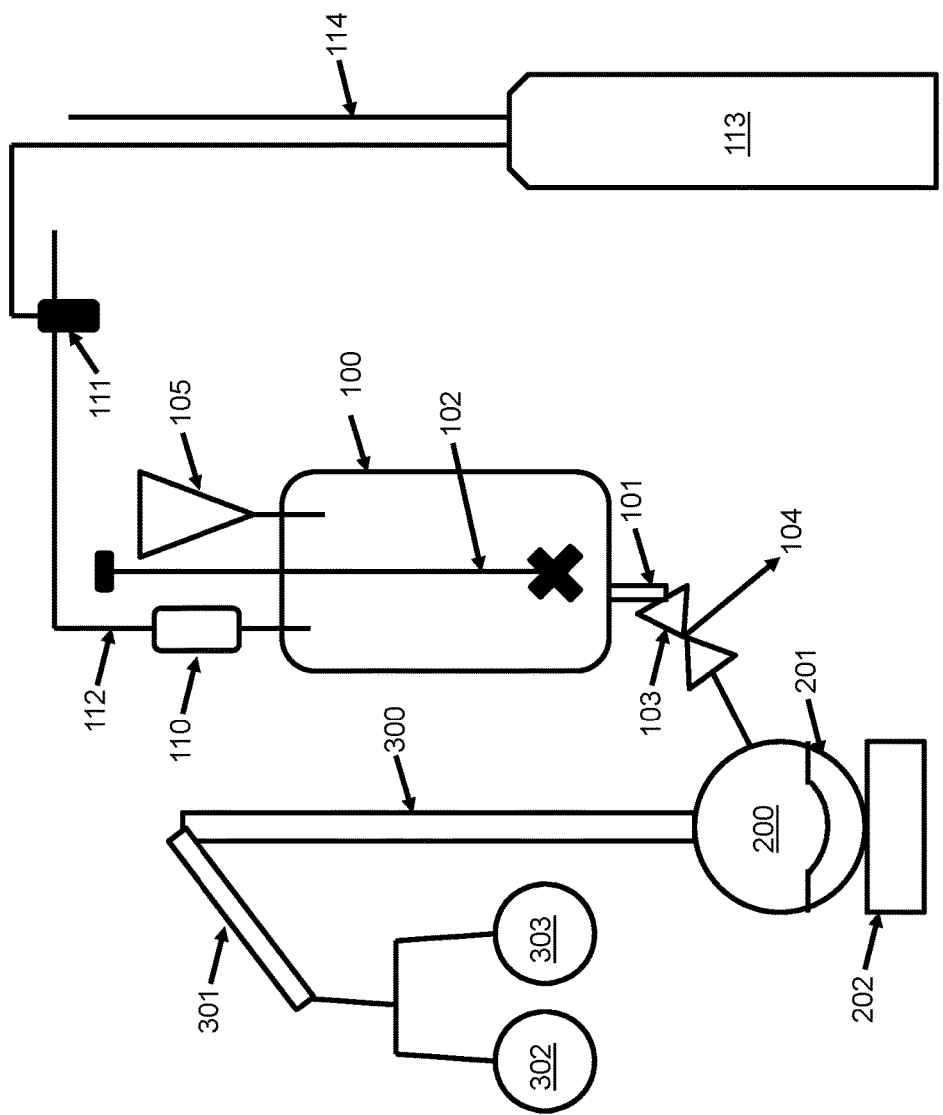
FIG. 1 is a schematic diagram of a commercial apparatus in which the disclosed synthesis methods may be performed.

Methods of synthesizing inorganic silanes suitable for use as deposition precursors in the semiconductor industry are disclosed. More particularly, the disclosed methods produce inorganic silane products without any impurities from other halide molecules that may occur when synthesized using the Finkelstein halide-exchange reaction (i.e., $MX^1$+ $SiR_3X^2 \rightarrow SiR_3X^1 + MX^2$). The disclosed methods also do not produce any salt byproducts. Salt contamination and/or impurities may cause damage to the underlying substrate during the deposition process. As semiconductor manufacturing requires high purity components, the ability to produce the inorganic silane reaction products with no salt byproduct formation or halide contamination is beneficial. Additionally, the resulting reaction product mixture is benzene-free, making it less hazardous and therefore easier to handle at commercial volumes.

The methods comprise mixing a halide or halogen reactant having the formula:

wherein X is Cl, Br, or I, with a silane reactant having the formula:

wherein x=1-4; y=1-9; z=1-9; y+z=2x+2; and R is an unsaturated C4 to C8 cyclic hydrocarbon or heterocycle group, provided that a C6 cyclic aromatic includes at least one hydrocarbyl ligand to produce the inorganic silane (i.e., $Si_xH_aX_b$, wherein a=1-9, b=1-9, and a+b=2x+2) and RH reaction product mixture, or:

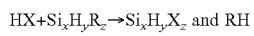

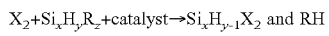

The HX and $X_2$ reactants are commercially available. All of the HX and $X_2$ reactants are toxic and corrosive, so care should be taken during handling and use. HBr and HI are air and light sensitive. $Cl_2$ is a compressed oxidizing gas and $Br_2$ is fatal if inhaled, so both should be handled under an inert atmosphere. $I_2$ is the least problematic of the $X_2$ family in terms of handling and may be measured in the air and added directly to the reaction vessel, although it remains toxic and corrosive and should be handled with care. The $X_2$ reactant has a purity ranging from approximately 95% wt/wt to approximately 100% wt/wt, and preferably from approximately 99% wt/wt to approximately 100% wt/wt. $Br_2$ and $I_2$ are commercially available from Sigma Aldrich at purities as high as 99.99% and 99.999% trace metals basis, respectively.

The water content in the HX and $X_2$ reactants should be minimized to prevent formation of siloxane by-products (i.e., Si—O—Si). Preferably, the water content range from approximately 0% w/w to approximately 0.001% w/w (10 ppmw). If necessary, the HX and $X_2$ reactants may be dried prior to synthesis using standard techniques, such as refluxing over $P_2O_5$, treating with a molecular sieve, or heating under vacuum.

The reaction vessel is made of a material that is compatible with the reactants and products. Exemplary materials include glass, perfluoroalkoxy alkanes (PFA), and polytetrafluoroethylene (PTFE). Stainless steel is not a compatible material with the $X_2$ reactant due to the potential for corrosion upon exposure to any moisture. The vessel is jacketed or placed in a cooling bath. The reaction vessel includes a stirring mechanism made of a compatible material, such as glass stirring shafts, PTFE paddle stirrers, and/or PTFE coated stainless steel impellers. The reaction vessel is designed to perform the synthesis under an inert atmosphere, such as $N_2$ or a noble gas. When a HI or HBr halide reactant is used, precautions to minimize the exposure of the reactants and reaction mixture to light may also be taken, such as covering any clear glassware in tin foil. For synthesis of $SiH_2I_2$, amber colored glassware is not suitable because the iron oxide coating may contaminate the product. Additionally, the reaction vessel, stirring mechanism, and any other associated equipment, such as a Schlenk line or glovebox, should be air- and moisture-free using standard drying techniques, such as vacuum, inert gas flow, oven drying, etc.

One of ordinary skill in the art will recognize the sources for the equipment components of the systems used to practice the disclosed methods. Some level of customization of the components may be required based upon the desired temperature range, pressure range, local regulations, etc. Exemplary equipment suppliers include Buchi Glas Uster AG, Shandong ChemSta Machinery Manufacturing Co. Ltd., Jiangsu Shajabang Chemical Equipment Co. Ltd, etc. As discussed above, the components are preferably made of corrosion resistant materials, such as glass, glass-lined steel, or steel with corrosion resistant liners, etc.

The reaction vessel may contain an anhydrous solvent to which the HX or $X_2$ reactant is added. Alternatively, the HX or $X_2$ reactant may be charged to the vessel and the solvent subsequently added. In another alternative, no solvent is required. Exemplary solvents include hydrocarbons, such as toluene, cyclohexane, n-heptane, and mixtures thereof. Alternatively, the solvent may be a hydrofluoroether, such as methyl perfluoropropyl ether, methyl nonafluorobutyl ether, ethyl nonafluorobutyl ether, 1,1,1,2,2,3,4,5,5,5-decafluoro-3-methoxy-4-(trifluoromethyl)-pentane, 3-ethoxy-1,1,1,2,3,4,4,5,5,6,6,6-dodecafluoro-2-trifluoromethyl-hexane, $C_5F_{10}H_2$, and mixtures thereof. These hydrofluoroether solvents are nonflammable. Exemplary hydrofluoroethers include the mixtures of methyl nonafluorobutyl ether and ethyl nonafluorobutyl ether sold by 3M Company under the trade names of Novec HFE 7100 and Novec HFE 7200. $C_5F_{10}H_2$ is commercially available from DuPont under the trade name Vertrel. The solvent has a purity ranging from approximately 95% wt/wt to approximately 100% wt/wt, and preferably from approximately 99% wt/wt to approximately 100% wt/wt.

Like the halide or halogen reactant, the solvent should also be anhydrous to prevent formation of siloxane by-products (i.e., Si—O—Si). Preferably, the water content range from approximately 0% w/w to approximately 0.001% w/w (10 ppmw). If necessary, the solvent may be dried prior to synthesis using standard techniques, such as refluxing over $P_2O_5$, treating with a molecular sieve, or heating under vacuum.

The silane reactant is added to the HX or $X_2$ reactant. The silane reactant has the formula:

$$Si_xH_yR_z$$

wherein x=1-4; y=1-9; z=1-9; y+z=2x+2; R is an unsaturated C4 to C8 cyclic hydrocarbon or heterocycle group, provided that a C6 cyclic aromatic includes at least one alkyl ligand. When R is not a C6 cyclic aromatic, it may be unsubstituted. Alternatively, R may be substituted by one or more saturated C1 to C10 alkyl ligands. R may be any unsaturated cyclic C4-C8 hydrocarbon, such as cyclobutene, cyclobutadienyl, cyclopentene, cyclopentadienyl, cyclohexene, cyclohexadienyl, toluene, ethylbenzene, xylene, mesitylene, durene, cycloheptene, cycloheptadiene, tropylium, cyclooctene, cyclooctadiene, or cyclooctatetraene. Alternatively, R may be an unsaturated cyclic C4-C8 heterocycle, such as furan or pyridine. R is selected so that the $Si_xH_aX_b$ and RH reaction products may be easily separated.

Preferably, R is an aromatic hydrocarbon, such as toluene, ethylbenzene, xylene, mesitylene, or durene. Alternatively, the aromatic hydrocarbon may also be naphthalene or azulene. In another alternative, the aromatic hydrocarbon may be cyclopendatienyl, tropylium, or cyclooctatetraene. The aromatic hydrocarbon is more reactive to the HX and $X_2$ halide or halogen reactants and the $Si_xH_yX_z$ product than the non-aromatic unsaturated R groups, which may help to increase yield of the desired product and reduce the production of polymer by-products.

Exemplary silane reactants include $H_3SiR$, $H_5Si_2R$, $H_7Si_3R$, and $H_9Si_4R$. These silane reactants may be flammable and should be handled under an inert atmosphere, such as Ar, $N_2$, He, or Kr.

Exemplary $H_3SiR$ silane reactants include $H_3Si(C_6R_5)$ having the formula:

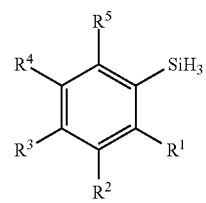

with $R^1$, $R^2$, $R^3$, $R^4$, and $R^5$ being independently selected from H or a $C_1$ to $C_{10}$ alkyl group, provided that at least one of $R^1$, $R^2$, $R^3$, $R^4$, and $R^5$ is not H. More particularly, the silane reactant may be p-tolyl-silane having the formula:

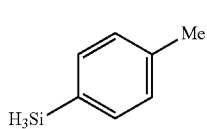

m-tolyl silane having the formula:

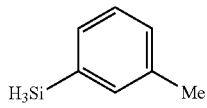

o-tolyl silane having the formula:

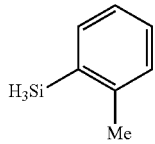

p-ethylphenyl silane having the formula:

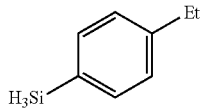

m-ethylphenyl silane having the formula:

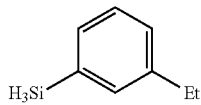

o-ethylphenyl silane having the formula:

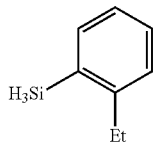

m-xylene silane having the formula:

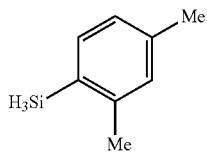

or o-xylene silane having the formula:

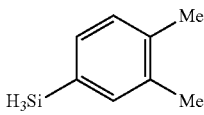

The silane reactants may be commercially available. Alternatively, the silane reactants may be synthesized by reacting RMgBr with $Si_xCl_{2x+1}$ to form $RSi_xCl_{2x+1}$ and reducing $RSi_xCl_{2x+1}$ with lithium aluminum hydride. $AlCl_3$ may be used as a catalyst to help form $RSi_xCl_{2x+1}$. The freshly synthesized silane reactant may be purified using distillation. The silane reactant should have a purity ranging from approximately 95% wt/wt to approximately 100% wt/wt, and preferably from approximately 98% wt/wt to approximately 100% wt/wt.

The disclosed synthesis reactions may proceed with the help of a catalyst. Exemplary catalysts include ethyl acetate, Palladium (II) acetate, triphenyl phosphine oxide, acetone, or combinations thereof. These catalysts are commercially available. The catalyst has a purity ranging from approximately 95% w/w to approximately 100% w/w, and preferably from approximately 99% w/w to approximately 100% w/w.

The silane reactant may be mixed with the catalyst to form a silane/catalyst mixture prior to addition to the HX or $X_2$ halide or halogen reactant. Alternatively, the silane reactant may be added to the HX or $X_2$ halide or halogen reactant followed by addition of the catalyst. The palladium acetate catalyst is not consumed during the synthesis reaction. In contrast, the ethyl acetate catalyst is. Therefore, addition of the ethyl acetate catalyst directly to the HX or $X_2$ halide or halogen reactant is not recommended because the catalyst reacts with the halide or halogen reactant which will result in less yield of the desired product. In contrast, the palladium acetate catalyst may be added directly to the reactor prior to addition of the remaining reactants or it may be added directly to the HX or $X_2$ halide or halogen reactant. Preferably, palladium acetate is added with $I_2$ directly to the reactor.

The silane reactant may be mixed with a solvent prior to addition to the HX or $X_2$ reactant. Alternatively, no solvent may be required. Exemplary solvents include hydrocarbons, such as toluene, cyclohexane, n-heptane, and mixtures thereof. Alternatively, the solvent may be a hydrofluoroether, such as methyl perfluoropropyl ether, methyl nonafluorobutyl ether, ethyl nonafluorobutyl ether, 1,1,1,2,2,3,4,5,5,5-decafluoro-3-methoxy-4-(trifluoromethyl)-pentane, 3-ethoxy-1,1,1,2,3,4,4,5,5,6,6,6-dodecafluoro-2-trifluoromethyl-hexane, $C_5F_{10}H_2$, and mixtures thereof. The hydrofluoroether solvents are nonflammable. Exemplary hydrofluoroethers include the mixtures of methyl nonafluorobutyl ether and ethyl nonafluorobutyl ether sold by 3M Company under the trade names of Novec HFE 7100 and Novec HFE 7200. $C_5F_{10}H_2$ is commercially available from DuPont under the trade name Vertrel. The solvent has a purity ranging from approximately 95% wt/wt to approximately 100% wt/wt, and preferably from approximately 99% wt/wt to approximately 100% wt/wt.

The molar ratio of halide or halogen and silane reactants may range from approximately 10:1 to approximately 1:10, preferably 2:1 to 1:2, and more preferably 1:1, as needed to optimize the formation of the desired product and/or to simplify the purification of the desired product.

The silane reactant, either neat or mixed with the catalyst and/or solvent, is added to the HX or $X_2$ reactant. The reaction is exothermic. Therefore, the silane reactant should be added slowly. Preferably, for $SiH_2I_2$ synthesis, the temperature of the reaction should be maintained at a temperature ranging from approximately −20° C. to approximately 15° C., and more preferably from approximately −8° C. to approximately 5° C. At higher temperatures, the HI intermediate may evaporate, resulting in a loss of yield. As a result, the addition is slow. Depending on the batch size, the addition may take several hours. One of ordinary skill in the art would recognize that alternate temperature ranges may be needed for different $Si_xH_aX_b$ inorganic silane products.

After addition of the silane reactant, the resulting mixture is stirred for an additional 6 to 15 hours to produce the inorganic silane (i.e., $Si_xH_aX_b$) and RH reaction product mixture.

The reaction may also be performed in a continuous reactor by feeding the silane reactant, possibly diluted in a solvent, together with the halide or halogen reactant, possibly suspended in a solvent, and passing them at a controlled residence time and temperatures in a flow through reactor. The flow of each reactant may be controlled by metering pumps such as peristaltic pumps. The reaction mixture may then be collected in a receiving vessel, and separated as in the batch synthesis example above. Alternatively, any solid fraction may be removed in line, using for instance a centrifuge pump (commercially available). The product may also be separated from the solvent(s) by continuously feeding the filtered fraction to a continuous distillation or crystallization unit.

The inorganic silane may be separated or isolated from the reaction product mixture by filtration, sublimation, distillation, or crystallization. For example, when the melting points of the inorganic silane and RH reaction products differ significantly, the mixture may be heated or cooled to the temperature at which one of the two is a solid or liquid and the other is liquid or gas, provided that the temperature does not negatively affect the product.

When the inorganic silane is a solid, the reaction product may be filtered to remove impurities and obtain the inorganic silane product. The product may be extracted using a solvent, such as pentane. Typical filters include glass or polymer fritted filters. The inorganic silane may then be isolated using sublimation at a temperature range above room temperature, preferably at a range from 25° C. to 150° C., more preferably at a range from 30° C. to 120° C., even more preferably at a range from 50° C. to 70° C. Alternatively, the inorganic silane may be isolated using sublimation at reduced pressure, preferably at a range from approximately 30 mTorr to approximately 750 Torr. In another alternative, sublimation may occur under both elevated temperature and reduced pressure.

Alternatively, when the inorganic silane is a liquid, the reaction product may be filtered to remove solid byproducts. A filtration agent such as anhydrous diatomaceous earth may be employed to improve the process. Typical filters include glass or polymer frit filters. This step may be sufficient to produce the inorganic silane.

Occasionally, the filtrate may need further processing. For example, when the filtrate yields a heterogeneous suspension of solid material, the filtrate may then be distilled over a short path column to yield the inorganic silane through a flash distillation process that removes some or all of the non-desired reaction products or impurities. Alternatively, the inorganic silane may be isolated from the filtrate through a distillation column or by heating the filtrate to approximately the boiling point of the inorganic silane. In another alternative, both the flash process and the distillation column may be necessary. One of ordinary skill in the art will recognize that the boiling point of the reaction product will change as the inorganic silane is isolated from the reaction product and adjust the recovery temperature accordingly. Any silane reactant may be vented through a distillation column. One of ordinary skill in the art will recognize that the vented silane reactant may be recovered for later use or disposal.

The disclosed methods may convert approximately 60% mol/mol to approximately 95% mol/mol, preferably from approximately 90% mol/mol to approximately 95% mol/mol, of the silane reactant to the inorganic silane reaction product. Impurities may include the RH reaction product, HX, and $Si_xH_aX_b$ analogs.

The inorganic silane reaction product may be further purified by distillation, sublimation, or recrystallization. The purified inorganic silane has a purity ranging from approximately 97% mol/mol to approximately 100% mol/mol, preferably from approximately 99% mol/mol to approximately 100% mol/mol. The purified inorganic silane preferably comprises between the detection limit and 100 ppbw of metal contaminants (e.g., at least Al, Ca, Cr, Cu, Fe, Mg, Ni, K, Na, Ti, Zn, etc.). The concentration of X (wherein X=Cl, Br, or I) in the purified inorganic silane reaction product may range from approximately 0 ppmw to approximately 100 ppmw, and more preferably from approximately 0 ppmw and to approximately 10 ppmw. Suitable distillation methods include atmospheric fractional distillation or batch fractional distillation or vacuum fractional distillation. The batch fractional distillation may be performed at low temperature and pressure, but is preferably performed at atmospheric pressure. Alternatively, the inorganic silane reaction product may be purified by continuous distillation over two distillation columns to separate the inorganic silane from both low and high boiling impurities in sequential steps.

An important alternative purification technique that may be employed when distillation is not effective to isolate UHP diiodosilane is Fractional Crystallization. Such an example is when the raw material p-Tolylsilane is contaminated with p-chlorotoluene and distillation of the crude synthesis product is unsuccessful in removing the inert p-chlorotolylsilane from diiodosilane given their respective boiling points (162° C. versus 147° C.). In this case, a fractional crystallization is performed by dissolving the DIS/p-chlorotoluene mixture in an equal volume of pentane and cooling the mixture down to temperatures between −70 and −20° C., preferably −40° C. Diiodosilane is furnished as a white crystalline solid and the impurity p-chlorotoluene remains dissolved in the supernatant layer with pentane. Subsequent decantation of this supernatant affords UHP diiodosilane free from p-chlorotoluene (0% w/w to 100 ppmw).

As shown in the examples below, the purified product may be analyzed by gas chromatography mass spectrometry (GCMS) which shows its purity. The structure of the product may be confirmed by $^1H$, $^{13}C$ and/or $^{29}Si$ NMR.

FIG. 1 is a schematic diagram of an apparatus in which the disclosed synthesis methods may be performed. For example, iodine ($I_2$) and a solvent, such as toluene or a mixture of methyl nonafluorobutyl ether and ethyl nonafluorobutyl ether, are added to a jacketed glass reactor 100 equipped with a bottom drain 101 and a paddle stirrer 102. The jacket initially maintains the reactor 100 at a temperature ranging from approximately −20° C. to approximately 15° C., and preferably from approximately −8° C. to approximately 5° C. The iodine is sparingly soluble in toluene and less so in the ether mixture. As a result, the paddle stirrer 102 initially simply agitates the contents of the reactor 100.

P-tolyl silane and ethyl acetate are mixed under an inert atmosphere, such as $N_2$. The resulting silane/catalyst mixture is added to the reactor 100 via a liquid metering pump 105, such as a diaphragm pump, peristaltic pump, or syringe pump. A temperature sensor (not shown) monitors the temperature of the contents of the vessel 100. Due to the exothermic nature of the reaction, the sensor communicates with the liquid metering pump 105 during the addition to ensure that the temperature of the contents of the reactor 100 remains between approximately −20° C. to approximately 15° C., and more preferably from approximately −8° C. to approximately 5° C. The paddle stirrer 102 continues to mix the contents of the reactor 100 during and after the addition of the silane/catalyst mixture.

The reaction produces a HI intermediate (pTolSiH$_3$+ I$_2$→pTolSiH$_2$I+HI; pTolSiH$_3$+HI→SiH$_3$I+Toluene; SiH$_3$I+ I$_2$→SiH$_2$I$_2$+HI; pTolSiH$_2$I+HI→SiH$_2$I$_2$+Toluene). Any gaseous HI that escapes from the reaction mixture is condensed in the condenser 110, which is connected to a bubbler 111, $N_2$ line 112, scrubber 113, and vent 114. The condenser 110 contains a cold mixture, such as dry ice either alone or in combination with cyclohexanone or isopropyl alcohol, that liquefies the HI gas to prevent its escape to the environment.

Upon completion of the addition, the temperature of the vessel is reduced to a temperature ranging from approximately −78° C. to approximately −20° C. The progress of the reaction may be monitored using, for example, gas chromatography. Upon completion of the reaction, the predominant reaction products are toluene and $SiH_2I_2$, both liquids at standard temperature and pressure, with minor amounts of HI, (MePh)SiH$_2$, SiH$_3$I, and SiHI$_3$ impurities.

Toluene is less toxic than benzene. However, its boiling point ("bp") is closer to that of $SiH_2I_2$ (bp $SiH_2I_2$=approx. 147° C.; by of toluene=approx. 111° C.; by of benzene=approx. 85° C.). As a result, separation of the toluene and $SiH_2I_2$ using distillation is difficult. A suitable distillation apparatus will be long and may need to include structured packing material, such as fluorinated ethylene propylene (FEP) packing or glass beads to increase separate efficiency without sacrificing yield. One of ordinary skill in the art will also recognize that multiple distillations may be necessary to obtain product having suitable purity requirements. As a result, one of ordinary skill in the art would not expect commercial success when replacing the prior art benzene with toluene, even though toluene is less toxic than benzene. Too much time would be required to distill the $SiH_2I_2$ inorganic silane from the toluene to produce suitable purity for use in the electronics industry.

The toluene and $SiH_2I_2$ reaction products may be separated by crystallization. The melting point of toluene (−93° C.) is much lower than the melting point of $SiH_2I_2$ (−1° C.). Separation using crystallization would be difficult to impossible from benzene, which has a melting point (i.e., 5.5° C.) too close to that of $SiH_2I_2$. The temperature of the reactor 100 may be reduced to below the melting point of the $SiH_2I_2$ product (i.e., to a temperature between approximately −20° C. to approximately −78° C.). The solid $SiH_2I_2$ product sinks to the bottom of the reactor 100. In this alternative, the toluene and $SiH_2I_2$ reaction products are separated more quickly and effectively. Once the reactor 100 is cooled, the $SiH_2I_2$ product crystallizes very quickly. The toluene remains as a liquid and may be removed via the drain 101 to a solvent collector 104. The drain 101 includes a filter (not shown) to retain the solid $SiH_2I_2$ product in the reactor 100.

The temperature of the reactor 100 may then be increased to approximately 15° C. to approximately 30° C. so that the $SiH_2I_2$ product melts and can also be removed through the drain 101. The valve 103 is switched so that the $SiH_2I_2$ product is diverted to the pot 200 of a distillation apparatus 300. The distillation apparatus 300 includes condenser 301 and 2 separate flasks, 302 and 303. The product from the condenser is diverted to flask 302 to collect condenser product earlier in the distillation process as it is rich in volatile impurities. After a predetermined time, the condenser product is diverted to flask 303, which contains the desired purified product. One of ordinary skill in the art will recognize that a switching mechanism, such as a valve, (not shown) is used to make the diversions and that normal process optimization will determine the best time and amount of material to collect in flask 302. The $SiH_2I_2$ crystals contain smaller quantities of the toluene byproduct than product isolated by distillation alone. As a result, only one distillation of the $SiH_2I_2$ product is needed to achieve the purity required in the electronics industry.

As illustrated in the examples that follow, the disclosed processes selectively form $SiH_2I_2$ and toluene in the reaction product mixture. The reaction product mixture contains small amounts of SiH$_3$I and SiHI$_3$ byproducts. Applicants believe that Br$_2$ would react analogously to I$_2$. Applicants also believe that the disclosed processes may be successfully performed on polysilanes (i.e., Si$_2$, Si$_3$) because the reaction kinetics would be similar. One of ordinary skill in the art will recognize that competition between the Si—Si bond cleavage and arene protonolysis may require the optimization of process parameters and/or use of an alternative solvent. Product yield may be further maximized by removing any solids formed and optimizing residence time and temperature to prevent halogen scrambling and side reactions.

The purified inorganic silane has a purity ranging from approximately 95% w/w to approximately 100% w/w, preferably from approximately 98% w/w to approximately 100% w/w, and more preferably from approximately 99% w/w to approximately 100% w/w. As a result, the purified inorganic silane is a Si-containing film forming composition suitable for vapor deposition in the electronics industry. The Si-containing film forming compositions contains between approximately 0.0% w/w and 0.2% w/w toluene, and preferably between 0.0% w/w and 0.1% w/w. The Si-containing film forming compositions contains between approximately 0.0% w/w and 0.1% w/w SiH$_3$I, and preferably between 0.0% w/w and 0.05% w/w. The Si-containing film forming compositions contains between approximately 0.0% w/w and 0.2% w/w SiHI$_3$, and preferably between 0.0% w/w and 0.1% w/w. The Si-containing film forming compositions contains between approximately 0.0% w/w and 0.1% w/w HI, and preferably between 0.0% w/w and 0.05% w/w.

The advantages of the disclosed synthesis methods are as follows:

Avoids production of human carcinogen benzene;
One step-one pot reactions;
The process may be solventless;
The solvent may be non-flammable; and
Simple purification.

Also disclosed are methods of using the disclosed inorganic silanes for vapor deposition methods. The disclosed methods provide for the use of the inorganic silanes for deposition of silicon-containing films. The disclosed methods may be useful in the manufacture of semiconductor, photovoltaic, LCD-TFT, or flat panel type devices. The method includes: introducing the vapor of the disclosed inorganic silanes into a reactor having a substrate disposed therein: and depositing at least part of the disclosed inorganic silanes onto the substrate via a deposition process to form a Si-containing layer.

The disclosed methods also provide for forming a bimetal-containing layer on a substrate using a vapor deposition process and, more particularly, for deposition of $SiMO_x$ or $SiMN_x$ films, wherein x may be 0-4 and M is Ta, Nb, V, Hf, Zr, Ti, Al, B, C, P, As, Ge, lanthanides (such as Er), or combinations thereof.

The disclosed methods of forming silicon-containing layers on substrates may be useful in the manufacture of semiconductor, photovoltaic, LCD-TFT, or flat panel type devices. The disclosed inorganic silanes may deposit Si-containing films using any vapor deposition methods known in the art. Examples of suitable vapor deposition methods include chemical vapor deposition (CVD) or atomic layer deposition (ALD). Exemplary CVD methods include thermal CVD, plasma enhanced CVD (PECVD), pulsed CVD (PCVD), low pressure CVD (LPCVD), sub-atmospheric CVD (SACVD) or atmospheric pressure CVD (APCVD), flowable CVD (f-CVD), metal organic chemical vapor deposition (MOCVD), hot-wire CVD (HWCVD, also known as cat-CVD, in which a hot wire serves as an energy source for the deposition process), radicals incorporated CVD, and combinations thereof. Exemplary ALD methods include thermal ALD, plasma enhanced ALD (PEALD), spatial isolation ALD, hot-wire ALD (HWALD), radicals incorporated ALD, and combinations thereof. Super critical fluid deposition may also be used. The deposition method is preferably ALD, spatial ALD, or PE-ALD in order to provide suitable step coverage and film thickness control.

The vapor of the inorganic silanes is introduced into a reaction chamber containing a substrate. The temperature and the pressure within the reaction chamber and the temperature of the substrate are held at conditions suitable for vapor deposition of at least part of the inorganic silane onto the substrate. In other words, after introduction of the vaporized composition into the chamber, conditions within the chamber are such that at least part of the vaporized precursor is deposited onto the substrate to form the silicon-containing film. A co-reactant may also be used to help in formation of the Si-containing layer.

The reaction chamber may be any enclosure or chamber of a device in which deposition methods take place, such as, without limitation, a parallel-plate type reactor, a cold-wall type reactor, a hot-wall type reactor, a single-wafer reactor, a multi-wafer reactor, or other such types of deposition systems. All of these exemplary reaction chambers are capable of serving as an ALD reaction chamber. The reaction chamber may be maintained at a pressure ranging from about 0.5 mTorr to about 760 Torr. In addition, the temperature within the reaction chamber may range from about 20° C. to about 700° C. One of ordinary skill in the art will recognize that the temperature may be optimized through mere experimentation to achieve the desired result.

The temperature of the reactor may be controlled by either controlling the temperature of the substrate holder or controlling the temperature of the reactor wall. Devices used to heat the substrate are known in the art. The reactor wall is heated to a sufficient temperature to obtain the desired film at a sufficient growth rate and with desired physical state and composition. A non-limiting exemplary temperature range to which the reactor wall may be heated includes from approximately 20° C. to approximately 700° C. When a plasma deposition process is utilized, the deposition temperature may range from approximately 20° C. to approximately 550° C. Alternatively, when a thermal process is performed, the deposition temperature may range from approximately 300° C. to approximately 700° C.

Alternatively, the substrate may be heated to a sufficient temperature to obtain the desired silicon-containing film at a sufficient growth rate and with desired physical state and composition. A non-limiting exemplary temperature range to which the substrate may be heated includes from 150° C. to 700° C. Preferably, the temperature of the substrate remains less than or equal to 500° C.

The type of substrate upon which the silicon-containing film will be deposited will vary depending on the final use intended. A substrate is generally defined as the material on which a process is conducted. The substrates may be any suitable substrate used in semiconductor, photovoltaic, flat panel, or LCD-TFT device manufacturing. Examples of suitable substrates include wafers, such as silicon, silica, glass, Ge, or GaAs wafers. The wafer may have one or more layers of differing materials deposited on it from a previous manufacturing step. For example, the wafers may include silicon layers (crystalline, amorphous, porous, etc.), silicon oxide layers, silicon nitride layers, silicon oxy nitride layers, carbon doped silicon oxide (SiCOH) layers, or combinations thereof. Additionally, the wafers may include copper layers, tungsten layers or metal layers (e.g. platinum, palladium, nickel, rhodium, or gold). The wafers may include barrier layers, such as manganese, manganese oxide, tantalum, tantalum nitride, etc. Plastic layers, such as poly(3,4-ethylenedioxythiophene)poly(styrenesulfonate) [PEDOT:PSS] may also be used. The layers may be planar or patterned. In some embodiments, the substrate may be a patterned photoresist film made of hydrogenated carbon, for example $CH_x$, wherein x is greater than zero (e.g., x≤4). In some embodiments, the substrate may include layers of oxides which are used as dielectric materials in MIM, DRAM, or FeRam technologies (for example, $ZrO_2$ based materials, $HfO_2$ based materials, $TiO_2$ based materials, rare earth oxide based materials, ternary oxide based materials, etc.) or from nitride-based films (for example, TaN) that are used as an oxygen barrier between copper and the low-k layer. The disclosed processes may deposit the silicon-containing layer directly on the wafer or directly on one or more than one (when patterned layers form the substrate) of the layers on top of the wafer. Furthermore, one of ordinary skill in the art will recognize that the terms "film" or "layer" used herein refer to a thickness of some material laid on or spread over a surface and that the surface may be a trench or a line. Throughout the specification and claims, the wafer and any associated layers thereon are referred to as substrates. The actual substrate utilized may also depend upon the specific precursor embodiment utilized. In many instances though, the preferred substrate utilized will be selected from hydrogenated carbon, TiN, SRO, Ru, and Si type substrates, such as polysilicon or crystalline silicon substrates.

The substrate may be patterned to include vias or trenches having high aspect ratios. For example, a conformal Si-containing film, such as $SiO_2$, may be deposited using any ALD technique on a through silicon via (TSV) having an aspect ratio ranging from approximately 20:1 to approximately 100:1.

The inorganic silanes may be supplied neat. Alternatively, the inorganic silanes may further comprise a solvent suitable for use in vapor deposition. The solvent may be selected from, among others, $C_1$-$C_{16}$ saturated or unsaturated hydrocarbons.

For vapor deposition, the inorganic silanes are introduced into a reactor in vapor form by conventional means, such as tubing and/or flow meters. The vapor form may be produced by vaporizing the inorganic silane through a conventional vaporization step such as direct vaporization, distillation, by bubbling, or by using a sublimator such as the one disclosed in PCT Publication WO2009/087609 to Xu et al. The inorganic silane may be fed in liquid state to a vaporizer where it is vaporized before it is introduced into the reactor. Alternatively, the inorganic silane may be vaporized by passing a carrier gas into a container containing the silane or by bubbling the carrier gas into the silane. The carrier gas may include, but is not limited to, Ar, He, or $N_2$, and mixtures thereof. Bubbling with a carrier gas may also remove any dissolved oxygen present in the composition. The carrier gas and inorganic silane are then introduced into the reactor as a vapor.

If necessary, the container may be heated to a temperature that permits the inorganic silane to be in its liquid phase and to have a sufficient vapor pressure. The container may be maintained at temperatures in the range of, for example, 0-150° C. Those skilled in the art recognize that the temperature of the container may be adjusted in a known manner to control the amount of inorganic silane vaporized.

In addition to the disclosed composition, a reaction gas may also be introduced into the reactor. The reaction gas may be an oxidizing agent such as $O_2$; $O_3$; $H_2O$; $H_2O_2$; oxygen containing radicals such as O. or OH.; NO; $NO_2$; carboxylic acids such as formic acid, acetic acid, propionic acid; radical species of NO, $NO_2$, or the carboxylic acids; para-formaldehyde; and mixtures thereof. Preferably, the oxidizing agent is selected from the group consisting of $O_2$, $O_3$, $H_2O$, $H_2O_2$, oxygen containing radicals thereof such as O. or OH., and mixtures thereof. Preferably, when an ALD process is performed, the co-reactant is plasma treated oxygen, ozone, or combinations thereof. When an oxidizing gas is used, the resulting silicon containing film will also contain oxygen.

Alternatively, the reaction gas may be a reducing agent such as one of $H_2$, $NH_3$, $(SiH_3)_3N$, hydridosilanes (such as $SiH_4$, $Si_2H_6$, $Si_3H_8$, $Si_4H_{10}$, $Si_5H_{10}$, $Si_6H_{12}$), chlorosilanes and chloropolysilanes (such as $SiHCl_3$, $SiH_2Cl_2$, $SiH_3Cl$, $Si_2Cl_6$, $Si_2HCl_5$, $Si_3Cl_8$), alkysilanes (such as $Me_2SiH_2$, $Et_2SiH_2$, $MeSiH_3$, $EtSiH_3$), hydrazines (such as $N_2H_4$, $MeHNNH_2$, $MeHNNHMe$), organic amines (such as $NMeH_2$, $NEtH_2$, $NMe_2H$, $NEt_2H$, $NMe_3$, $NEt_3$, $(SiMe_3)_2 NH$), diamines such as ethylene diamine, dimethylethylene diamine, tetramethylethylene diamine, pyrazoline, pyridine, B-containing molecules (such as $B_2H_6$, trimethylboron, triethylboron, borazine, substituted borazine, dialkylaminoboranes), alkyl metals (such as trimethylaluminum, triethylaluminum, dimethylzinc, diethylzinc), radical species thereof, or mixtures thereof. When a reducing agent is used, the resulting silicon containing film may be pure Si.

Alternatively, the reaction gas may be a hydrocarbon, saturated or unsaturated, linear, branched or cyclic, such as but not limited to ethylene, acetylene, propylene, isoprene, cyclohexane, cyclohexene, cyclohexadiene, pentene, pentyne, cyclopentane, butadiene, cyclobutane, terpinene, octane, octane, or combinations thereof.

The reaction gas may be treated by a plasma, in order to decompose the reaction gas into its radical form. $N_2$ may also be utilized as a reducing agent when treated with plasma. For instance, the plasma may be generated with a power ranging from about 50 W to about 500 W, preferably from about 100 W to about 200 W. The plasma may be generated or present within the reactor itself. Alternatively, the plasma may generally be at a location removed from the reactor, for instance, in a remotely located plasma system. One of skill in the art will recognize methods and apparatus suitable for such plasma treatment.

The desired silicon-containing film also contains another element, such as, for example and without limitation, B, P, As, Zr, Hf, Ti, Nb, V, Ta, Al, Si, or Ge.

The inorganic silane and one or more co-reactants may be introduced into the reaction chamber simultaneously (chemical vapor deposition), sequentially (atomic layer deposition), or in other combinations. For example, the inorganic silane may be introduced in one pulse and two additional metal sources may be introduced together in a separate pulse (modified atomic layer deposition). Alternatively, the reaction chamber may already contain the co-reactant prior to introduction of the inorganic silane. The co-reactant may be passed through a plasma system localized or remotely from the reaction chamber, and decomposed to radicals. Alternatively, the inorganic silane may be introduced to the reaction chamber continuously while other precursors or reactants are introduced by pulse (pulsed-chemical vapor deposition). In another alternative, the inorganic silane and one or more co-reactants may be simultaneously sprayed from a shower head under which a susceptor holding several wafers is spun (spatial ALD).

In one non-limiting exemplary atomic layer deposition process, the vapor phase of the inorganic silane is introduced into the reaction chamber, where it is contacted with a suitable substrate. Excess composition may then be removed from the reaction chamber by purging and/or evacuating the reaction chamber. An oxygen source is introduced into the reaction chamber where it reacts with the absorbed inorganic silane in a self-limiting manner. Any excess oxygen source is removed from the reaction chamber by purging and/or evacuating the reaction chamber. If the desired film is a silicon oxide film, this two-step process may provide the desired film thickness or may be repeated until a film having the necessary thickness has been obtained.

Alternatively, if the desired film is a silicon metal/metalloid oxide film (i.e., $SiMO_x$, wherein x may be 0-4 and M is B, Zr, Hf, Ti, Nb, V, Ta, Al, Si, Ga, Ge, or combinations thereof), the two-step process above may be followed by introduction of a vapor of a metal- or metalloid-containing precursor into the reaction chamber. The metal- or metalloid-containing precursor will be selected based on the nature of the silicon metal/metalloid oxide film being deposited. After introduction into the reaction chamber, the metal- or metalloid-containing precursor is contacted with the substrate. Any excess metal- or metalloid-containing precursor is removed from the reaction chamber by purging and/or evacuating the reaction chamber. Once again, an oxygen source may be introduced into the reaction chamber to react with the metal- or metalloid-containing precursor. Excess oxygen source is removed from the reaction chamber by purging and/or evacuating the reaction chamber. If a desired film thickness has been achieved, the process may be terminated. However, if a thicker film is desired, the entire four-step process may be repeated. By alternating the provision of the inorganic silane, metal- or metalloid-containing precursor, and oxygen source, a film of desired composition and thickness can be deposited.

Additionally, by varying the number of pulses, films having a desired stoichiometric M:Si ratio may be obtained. For example, a $SiMO_2$ film may be obtained by having one pulse of the inorganic silane and one pulse of the metal- or metalloid-containing precursor, with each pulse being followed by a pulse of the oxygen source. However, one of ordinary skill in the art will recognize that the number of pulses required to obtain the desired film may not be identical to the stoichiometric ratio of the resulting film.

The silicon-containing films resulting from the processes discussed above may include SiO$_2$; SiC; SiN; SiON; SiOC; SiONC; SiBN; SiBCN; SiCN; SiMCO, in which M is selected from Zr, Hf, Ti, Nb, V, Ta, Al, Ge, depending of course on the oxidation state of M. One of ordinary skill in the art will recognize that by judicial selection of the appropriate inorganic silane and co-reactants, the desired film composition may be obtained.

Upon obtaining a desired film thickness, the film may be subject to further processing, such as thermal annealing, furnace-annealing, rapid thermal annealing, UV or e-beam curing, and/or plasma gas exposure. Those skilled in the art recognize the systems and methods utilized to perform these additional processing steps. For example, the silicon-containing film may be exposed to a temperature ranging from approximately 200° C. and approximately 1000° C. for a time ranging from approximately 0.1 second to approximately 7200 seconds under an inert atmosphere, a H-containing atmosphere, a N-containing atmosphere, or combinations thereof. Most preferably, the temperature is 600° C. for less than 3600 seconds. Even more preferably, the temperature is less than 400° C. The annealing step may be performed in the same reaction chamber in which the deposition process is performed. Alternatively, the substrate may be removed from the reaction chamber, with the annealing/flash annealing process being performed in a separate apparatus. Any of the above post-treatment methods, but especially UV-curing, has been found effective to enhance the connectivity and cross linking of the film, and to reduce the H content of the film when the film is a SiN containing film. Typically, a combination of thermal annealing to <400° C. (preferably about 100° C.-300° C.) and UV curing is used to obtain the film with the highest density.

EXAMPLES

The following non-limiting examples are provided to further illustrate embodiments of the invention. However, the examples are not intended to be all inclusive and are not intended to limit the scope of the inventions described herein.

Example 1: Synthesis of di(iodo)silane (SiH$_2$I$_2$)

Figure 2:
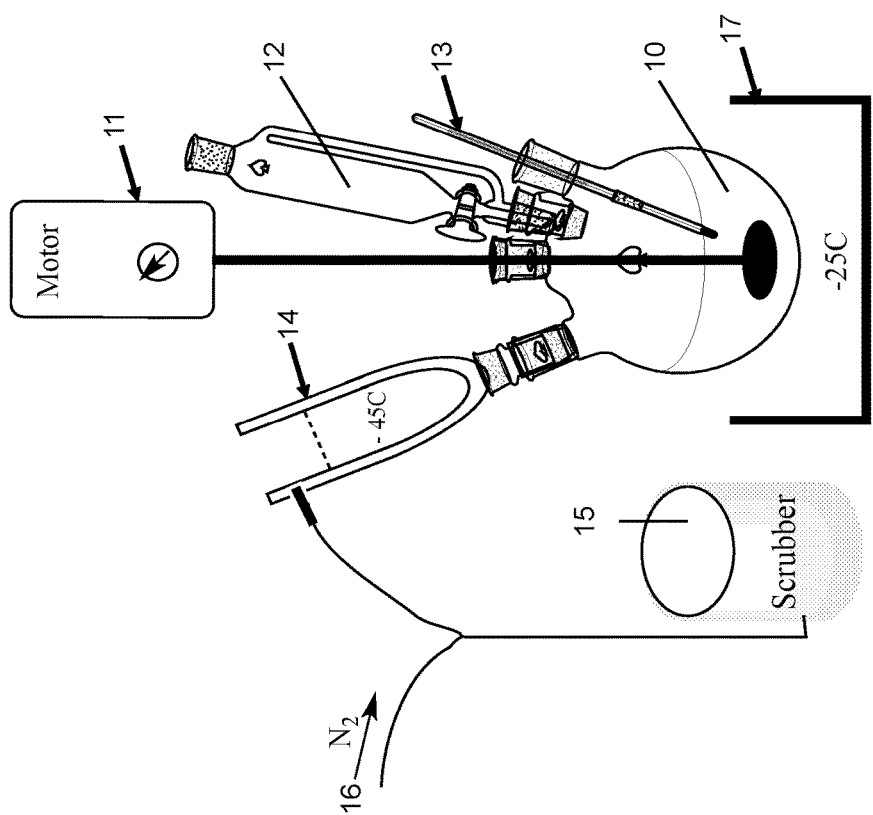
FIG. 2 is a schematic diagram of a lab-scale apparatus in which the disclosed synthesis methods may be performed.

The synthesis was performed using equipment similar to that illustrated in FIG. 2. A 5 L, 4-necked flask 10 equipped with a mechanical stirrer 11, liquid addition funnel 12, thermocouple 13, dry-ice condenser 14, and solid-addition port (replaced by thermocouple 13) was charged with Iodine (2042 g, 8.05 mol) and Toluene (360 mL). The dry-ice condenser 14 is connected to a scrubber 15 and inert gas line 16. The solid addition port was replaced with a glass stopper and the flask 10 and contents cooled to −10° C. with the aid of a dry ice/isopropyl alcohol cooling bath 17. Stirring was commenced at 400 RPM.

A solution of Ethyl acetate (9.89 mL, 0.1 mol) in p-Tolylsilane (1181 mL, 8.45 mol) was prepared and transferred via cannula (not shown) to the liquid addition funnel 12. The ethyl acetate/p-Tolylsilane solution was added dropwise over 5.5 hours at a rate that maintained the reaction temperature between −6° C. and +6° C. The temperature of the cooling bath 17 was adjusted to −65° C., the dry-ice condenser 14 recharged, and the mixture was allowed to stir for a further 15 hours while slowly warming to room temperature.

Gas Chromatography (GC) analysis showed that the crude reaction mixture included monoiodosilane (3.63%); Toluene (50.98%); diiodosilane (40.06%); Triiodosilane (1.1%) and para-Tolyliodosilane (1.26%).

The contents of the flask 100 were cooled to −60° C. and the supernatant decanted via vacuum cannula transfer removing most of the toluene and furnishing a mixture enriched with diiodosilane.

Subsequent fractional distillation of the crystallized residue under vacuum removed impurities and residual toluene furnishing ultra high purity (UHP) (99.45%) Diiodosilane.

Example 2: Synthesis of di(iodo)silane (SiH$_2$I$_2$)

The 5 L, 4-necked flask 10 of FIG. 2 was charged with Iodine (4350.4 g, 17.14 mol) and a mixture of methyl nonafluorobutyl ether and ethyl nonafluorobutyl ether sold by 3M Company under the trade name of Novec HFE 7100 (756 mL). The flask 10 and its contents were cooled to −10° C. with the aid of the dry ice/isopropyl alcohol cooling bath 17. Stirring was commenced at 400 RPM.

A solution of Ethyl acetate (21.84 mL, 0.22 mol) in p-Tolylsilane (2514 mL, 17.99 mol) was prepared and transferred via cannula to the liquid addition funnel 12. The p-Tolylsilane solution was added over 8 h, dropwise at a rate that maintained the reaction temperature between −6° C. and +6° C. Following completion of addition, the cooling bath 17 was adjusted to −65° C., the dry-ice condenser 14 recharged and the mixture was allowed to stir for a further 15 h while slowly warming to room temperature.

GC analysis showed that the crude reaction mixture included monoiodosilane (3.5%); Toluene (36%); diiodosilane (47%); Triiodosilane (2.6%) and para-Tolyliodosilane (2.9%).

Subsequent Fractional distillation of the crystallized residue under vacuum removed impurities and residual toluene furnishing UHP>99% Diiodosilane.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:
1. A method of synthesizing SiH$_2$I$_2$ having between approximately 0.0% w/w and 0.001% w/w benzene; the method comprising:
mixing at a temperature ranging from approximately −20° C. to approximately 15° C. a halide reactant having the formula HI or a halogen reactant having the formula I$_2$ with a silane reactant having the formula:

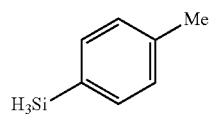

to produce a SiH$_2$I$_2$ and toluene reaction product mixture; and
separating the toluene from the SiH$_2$I$_2$ in the reaction product mixture by crystallization to produce SiH$_2$I$_2$ having between approximately 0.0% w/w and 0.001% w/w benzene.

2. The method of claim 1, wherein the halogen reactant is $I_2$.

3. The method of claim 1, further comprising adding the halide or halogen reactant to a solvent.

4. The method of claim 3, wherein the solvent is a hydrofluoroether or a hydrocarbon solvent.

5. The method of claim 4, wherein the hydrocarbon solvent is toluene, cyclohexane, n-heptane, or mixtures thereof.

6. The method of claim 4, wherein the hydrofluoroether solvent is methyl nonafluorobutyl ether, ethyl nonafluorbutyl ether, or mixtures thereof.

7. The method of claim 1, further comprising mixing the silane reactant and halide or halogen reactant in the presence of a catalyst, wherein the catalyst is ethyl acetate, Palladium (II) acetate, triphenyl phosphine oxide, acetone, or combinations thereof.

8. The method of claim 7, further comprising mixing the silane reactant and catalyst under an inert atmosphere.

9. The method of claim 1, further comprising increasing a temperature of the $SiH_2I_2$ to a temperature ranging from approximately 15° C. to approximately 30° C. after separating the toluene from the $SiH_2I_2$ to produce melted $SiH_2I_2$.

10. The method of claim 9, wherein the method is performed in one pot.

11. The method of claim 9, wherein the $SiH_2I_2$ contains between approximately 0.0% w/w and 0.2% w/w toluene.

12. The method of claim 1, wherein the separating step comprises reducing a temperature of the reaction product mixture to between approximately −20° C. and approximately −78° C.; and filtering the $SiH_2I_2$ from the toluene.

13. The method of claim 9, further comprising one distillation of the melted $SiH_2I_2$ to produce $SiH_2I_2$ having purity required in the electronics industry.

* * * * *